W. E. OTSTOT.
GAS FIXTURE.
APPLICATION FILED APR. 24, 1908.

927,673.

Patented July 13, 1909.

Witnesses
W. H. Rockwell
C. H. Griesbauer

Inventor
W. E. OTSTOT
By H. B. Willson & Co
Attorneys

UNITED STATES PATENT OFFICE.

WILBUR E. OTSTOT, OF MISHAWAKA, INDIANA.

GAS-FIXTURE.

No. 927,673.  Specification of Letters Patent.  Patented July 13, 1909.

Application filed April 24, 1908. Serial No. 429,021.

*To all whom it may concern:*

Be it known that I, WILBUR E. OTSTOT, citizen of the United States, residing at Mishawaka, in the county of St. Joseph and State of Indiana, have invented certain new and useful Improvements in Gas-Fixtures; and I do declare the following to be a full, clear, and exact description of the invention, such as will enable others skilled in the art to which it appertains to make and use the same.

My invention relates to gas fixtures, and particularly to portable fixtures.

In the ordinary run of cheaply constructed houses dresser lights are not provided, thus seriously inconveniencing occupants of these houses.

It is the object of my invention to avoid this difficulty and to provide a device which can be cheaply manufactured and sold so as to be within the range of all classes.

With these and other objects in view, the invention consists of certain novel features of construction, combination and arrangement of parts, as will be more fully described and particularly pointed out in the appended claim.

Figure 1:
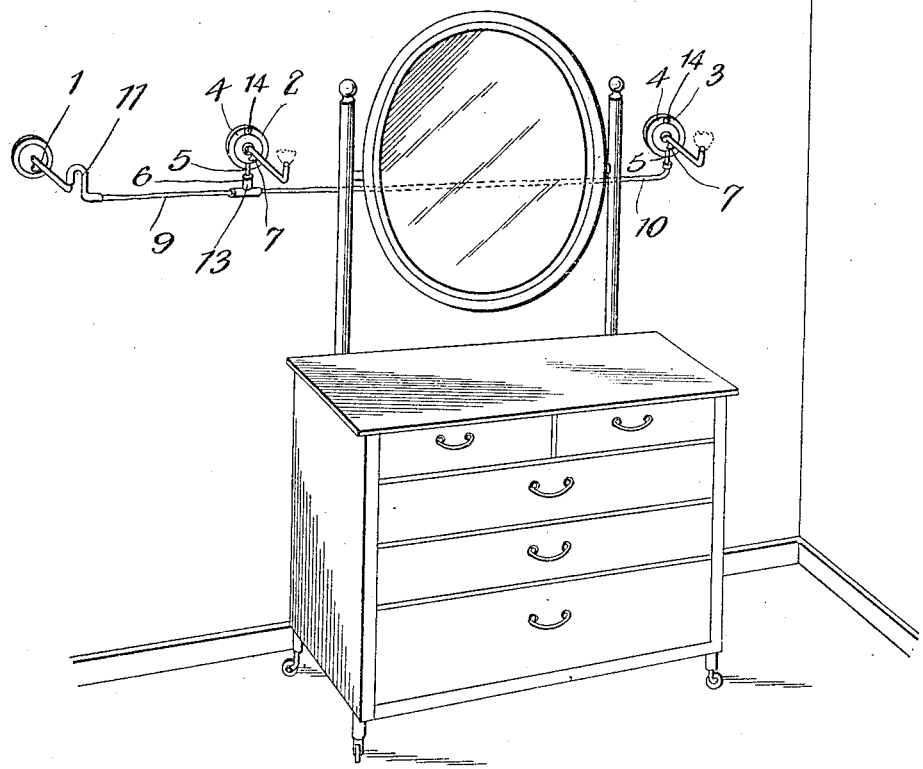
Figure 2:
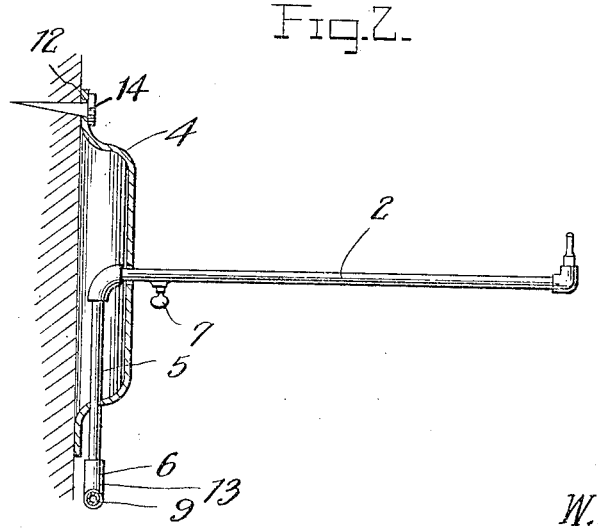

In the drawings, Figure 1 is a diagrammatic illustration of the application of my device, Fig. 2 is a side elevation partly in section of one of the fixtures.

Referring more especially to the drawings, 1 represents a stationary wall fixture and 2 and 3, portable fixtures which are provided with the dish-collars 4, through which the pipe 5, projects so as to connect with the inlet pipe 6. These fixtures are provided with valves 7, intermediate the jet 8, and the collar 4, and are connected with the permanent fixture 1 by flexible tubes 9 and 10, which are attached to the permanent fixture 1 by the usual goose neck 11. Each collar is provided with an aperture 12, through which a nail or other fastening device 14 may be passed. I do not wish to limit myself to this form of support, as any suitable form may be resorted to. For instance, a suitable suction cap may be secured upon the back of the collar 4, so as to hold the fixtures securely upon the wall.

The tubes 9 and 10 are connected together in any suitable manner. The method herein adopted being a three-way connection 13.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention what I claim and desire to secure by Letters Patent is:—

In a device of the class described, the combination with a permanent fixture, of portable fixtures comprising hollow disks having inlet and outlet openings, supply pipes leading into the disks, horizontal burner supporting pipes connected at their inner ends with the supply pipes and passing through the outlet openings of the disks, a three-way connection connected with the supply pipe of one portable fixture, a flexible tube between one side of said connection and the permanent fixture, a second flexible tube leading from the other side of said connection to the supply pipe of the other portable fixture, and independent inlet valves for the portable fixtures whereby the gas supply may be directed to either one or both of the same, the portable fixtures, three-way connection and flexible tubes forming a unitary structure which may be removed from position as a whole, and the flexible tubes providing for the adjustment of the portable fixtures at different heights.

In testimony whereof I have hereunto set my hand in presence of two subscribing witnesses.

WILBUR E. OTSTOT.

Witnesses:
T. J. SCHINDLER,
J. W. SCHINDLER.